United States Patent [19]

Lynch

[11] 4,333,835
[45] Jun. 8, 1982

[54] VERTICAL TUBE LIQUID POLLUTANT SEPARATORS

[75] Inventor: William M. Lynch, Glen Ellyn, Ill.

[73] Assignee: AFL Industries, Inc., Riviera Beach, Fla.

[21] Appl. No.: 907,826

[22] Filed: May 19, 1978

Related U.S. Application Data

[63] Continuation-in-part of Ser. No. 768,266, Feb. 14, 1977, abandoned.

[51] Int. Cl.³ .............................................. B01D 23/06
[52] U.S. Cl. .................................. 210/305; 210/310; 210/311; 210/320; 210/522; 210/537
[58] Field of Search ...................... 210/23 R, 735, 305, 210/310, 311, 320, 521, 522, 537, 538, DIG. 5

[56] References Cited

U.S. PATENT DOCUMENTS

| | | | |
|---|---|---|---|
| 1,804,743 | 5/1931 | Cannon | 210/305 |
| 2,468,864 | 5/1949 | Campbell | 210/537 |
| 3,346,122 | 10/1967 | Cornelissen | 210/522 |
| 3,529,728 | 9/1970 | Middelbeek et al. | 210/522 |
| 3,741,401 | 6/1973 | Hsiung | 210/521 |
| 3,788,981 | 1/1974 | Richard et al. | 210/522 |
| 3,812,970 | 5/1974 | Yamazaki | 210/521 |
| 3,898,164 | 8/1975 | Hsiung | 210/522 |
| 3,925,205 | 12/1975 | Sparham | 210/522 |
| 4,045,344 | 8/1977 | Yokota | 210/194 |
| 4,064,054 | 12/1977 | Anderson et al. | 210/DIG. 5 |

*Primary Examiner*—Gregory N. Clements
*Attorney, Agent, or Firm*—Hill, Van Santen, Steadman, Chiara & Simpson

[57] ABSTRACT

A plurality of elongated hollow, circular, foraminous substantially vertical tubes contiguously stacked transversely to the direction flowing liquid such as waste water containing foreign matter, i.e., settable solids and free oil, in a coalescer-separator apparatus provide a filter body providing for significant surface area contact by the liquid on both inside and outside surfaces of the tubes to entrap the foreign matter but defining substantially vertical passages permitting the entrapped foreign matter to be gravity separated with the lighter matter coalescing and floating upwardly and the heavier matter settling downwardly so that substantially clarified effluent flows from the apparatus. The stacked tube filter body is contained within an insulated closed container of a sufficient capacity, and the arrays of holes in the tube walls are coordinated with respect to the intended volumetric capacity of the apparatus, so that turbulence in the liquid flowing through the filter body is minimized.

18 Claims, 8 Drawing Figures

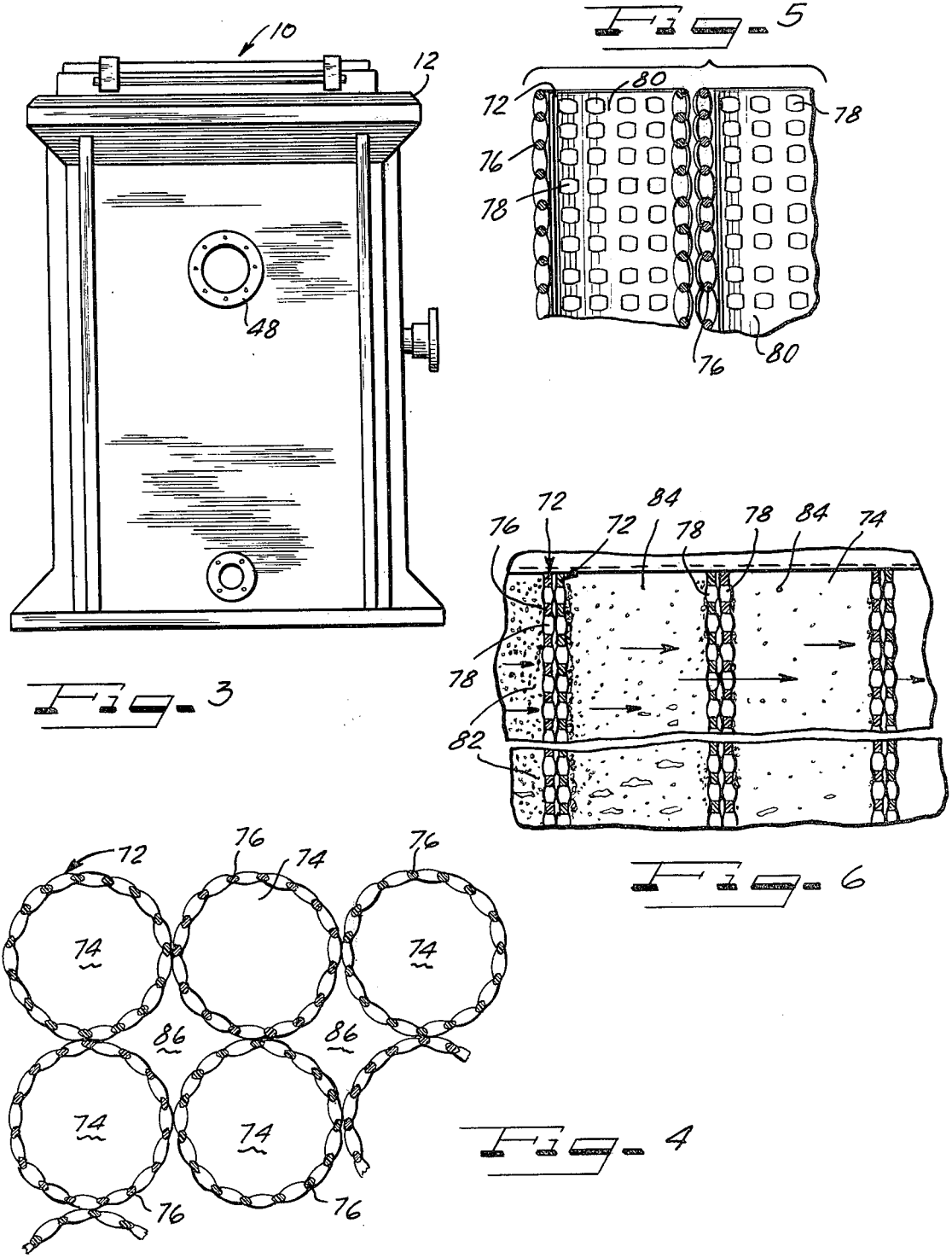

VERTICAL TUBE LIQUID POLLUTANT SEPARATORS

RELATED APPLICATION

This application is a continuation-in-part application of my copending application Ser. No. 768,266, filed Feb. 14, 1977 now abandoned.

BACKGROUND OF THE INVENTION

1. Field of the Invention

The invention relates to apparatus for gravity separation of foreign matter of different densities suspended in a flowing liquid.

2. Description of the Prior Art

The API (American Petroleum Institute) separator has been in long use and its operation is based on the principle of gravity differential separation. The fluid is usually a waste water which flows slowly through an elongated settling area. The foreign matter is in part lighter weight free oil in the water which floats upwardly for accumulation on the surface of the water while heavier weight foreign matter such as solids within the water gradually settle out and accumulate on the bottom of the separator. Separation occurs by natural action of gravity on the lighter and heavier foreign matter in the water over a period of time and there is no attempt to enhance or accelerate separation. A major disadvantage of the API separator is its size. The greater the flow volume and the higher the concentration of foreign matter, the greater must be the length of the separator to perform effectively. In recognition of this inherent deficiency, various means have been devised to accelerate separation and thereby allow a decrease in size of the separator.

U.S. Pat. No. 3,810,832 discloses a separator wherein separation is promoted by use of a barrier made of filaments of polypropylene positioned widthwise to the path of flow. The affinity of oils to strips of polypropylene and the like is disclosed in U.S. Pat. No. 3,668,118.

Another means is disclosed in U.S. Pat. No. 3,847,813 where a plurality of corrugated plates are placed transversely in the path of flow of waste water. Solids accumulate in the valleys while oils accumulate within the peaks of the corrugations. The oils and solids are then permitted to flow by gravity upwardly and downwardly as the case may be provided in the peaks and valleys.

A variation of the above-noted devices is incorporated in a curved plate-finger oil-water separator manufactured by Hellevoet B. V. of Holland. Separation of entrapped oil is promoted by mixing air with the waste water and then allowing oil droplets to form on a series of upwardly curved plates positioned laterally relative to the flow path.

Another separator, offered for sale by Atlas Chemical Industries, increases the rate of separation by diverting a flow of waste water in a downwardly inclined direction between a plurality of laterally positioned corrugated plates. Heavy sediment accumulates in the valleys of the corrugations and is carried downward for accumulation at the lower end of the plates. Oils accumulate within the peaks of the corrugations and flow upwardly in a counter-flow direction to the path of the waste water.

U.S. Pat. No. 3,451,555 wherein separation of water from a slurry is achieved by cascading the slurry over an inclined surface formed from transversely spaced bars.

SUMMARY OF THE INVENTION

A coalescer separator according to principles of this invention may include a covered, rectangular tank body preferably formed of a corrosion-resistant, water-tight, insulated construction and wherein laminar flow is promoted by protecting the flowing liquid from outside environmental influences. Laminar flow is further promoted by sizing the container with respect to the volume of liquid processed to ensure that the velocity of the flow is sufficiently low that turbulence is minimized.

The liquid flow, typically contaminated water containing such foreign matter as settleable solids and free oils, enters the separator through an appropriate inlet at one of the ends of the tank. The tank may be divided into a first distribution chamber, a second separation chamber, a third weir chamber and a final clean water chamber by a series of divider partitions.

From the inlet the contaminated water is directed downward into the distribution chamber from which the water flows through an appropriate full width perforated plate into the separation chamber. The separation chamber has a sludge catch basin in a plenum space covered with a grating which extends to cover the full area of this chamber. The grating may support a plurality of separator-coalescer tube packs or modules which desirably fill entirely across the chamber area. Each pack may contain approximately one hundred vertical hollow, perforated, i.e. foraminous, round tubes, formed of a material having a characteristic of attracting oils and repelling water if the liquid is contaminated water i.e. machine shop coolant, oil spill water, and the like and oil is a pollutant to be separated. A polypropylene-type oleophilic polymer material has such a characteristic.

Because of the tubular configuration and position of each foraminous tube with respect to each adjacent tube, there is significant surface area contact on both the outer and inner surfaces of the tubes in the generally, horizontal or flow of water therethrough developing an excellent separating or coalescing function. As the waste water flows in generally horizontal and downward direction through the arrays of perforation in the tubes, oils collect on surfaces inside the tubes and on surfaces outside the tubes in passages or channels between the tubes and coalesce and float upwardly and the solids settle downwardly. The oil floats to the surface of the water where it can be conveniently skimmed, while the solids pass through the grate under the modular foraminous tube filter to accumulate as a sludge below the grate.

The clarified waste water exits the separation chamber by flowing through the floor grating or other exit means at the rear or downstream end of the separation chamber and under a second widthwise partition and into the weir chamber. Before or after entering the weir chamber the at least partially clarified liquid flows through a final filter means which may comprise a pack of a plurality of oleophilic plastic screens positioned across the path of the exit flow of liquid from the chamber. The screen filter promotes further separation of the smallest oil particles which may not have been separated by the tubes in the separation chamber.

The level of clarified liquid in the weir chamber and the separation chamber is controlled by a third widthwise partition which acts as a weir. The height of this partition is such that a liquid level in the tank is maintained such that the top of the tubes are submerged allowing oil to accumulate above at least certain of the tubes and be skimmed from the surface by a skimmer positioned in the separation chamber. The waste water overflowing the weir partition collects in a clean water chamber from where it can be pumped or gravity fed from the tank.

There are several major advantages of the present vertical tube separator over the prior separators to which reference has been made hereinbefore. First, in spite of its smaller size, the present perforated vertical tube separator can separate large amounts of foreign matter without becoming contaminated or fouled. Additionally, space has been provided for the storage of a rapid accumulation of such foreign matter or pollutants if the percentage of pollutants in the liquid flow increases substantially over a short time span. Separation efficiency has been greatly increased because of the significantly large effective surface area in contact with the liquid flowing in a substantially laminar and generally horizontal direction through the foraminous tube separator in the separation chamber.

This allows separation, as an example, of significantly smaller size oil droplets than heretofore possible. Efficient separation is without merit, however, if the once separated matter is not immediately transferred to allow separation to continue. The matrix of hollow foraminous tubes allows for continuous removal because of liquid flow stream being directed transversely through the foraminous walls of the tubes and there thus being almost no resistance to vertical flow within the vertical passages formed by the tubes so as to allow the light separated matter to float upwardly and heavy separated matter to settle out downwardly.

Another advantage of the system method and apparatus of the present invention is that the separated pollutants can be easily removed from the tank by skimming the light pollutants and pumping out the accumulated sludge as required. Further, the entire system can be easily cleaned and returned to service in a minimum of time and expense in that the tubes are in convenient packs which can be easily removed, cleansed and then replaced. Existing systems cannot be cleaned nearly as easily.

It should be understood that apparatus and the method as described are not limited to processing waste water containing sedimentable solids and free oils, but are suitable for use in separating foreign matter from any flowing liquid where there is sufficient difference between the specific gravity of the foreign matter and the carrier liquid.

BRIEF DESCRIPTION OF THE DRAWINGS

FIG. 3 is an end view of the separator of FIG. 1.

FIG. 4 is an enlarged fragmentary horizontal sectional detail view of a portion of the vertical tube filter matrix.

FIG. 5 is a vertical sectional detail view through two of the interfacing tubes of FIG. 4.

FIG. 6 is a view similar to FIG. 5 depicting a flow of contaminated liquid generally horizontally through the tubes with the resulting separation of oils and solids.

DETAILED DESCRIPTION OF PREFERRED EMBODIMENTS

Figure 1:
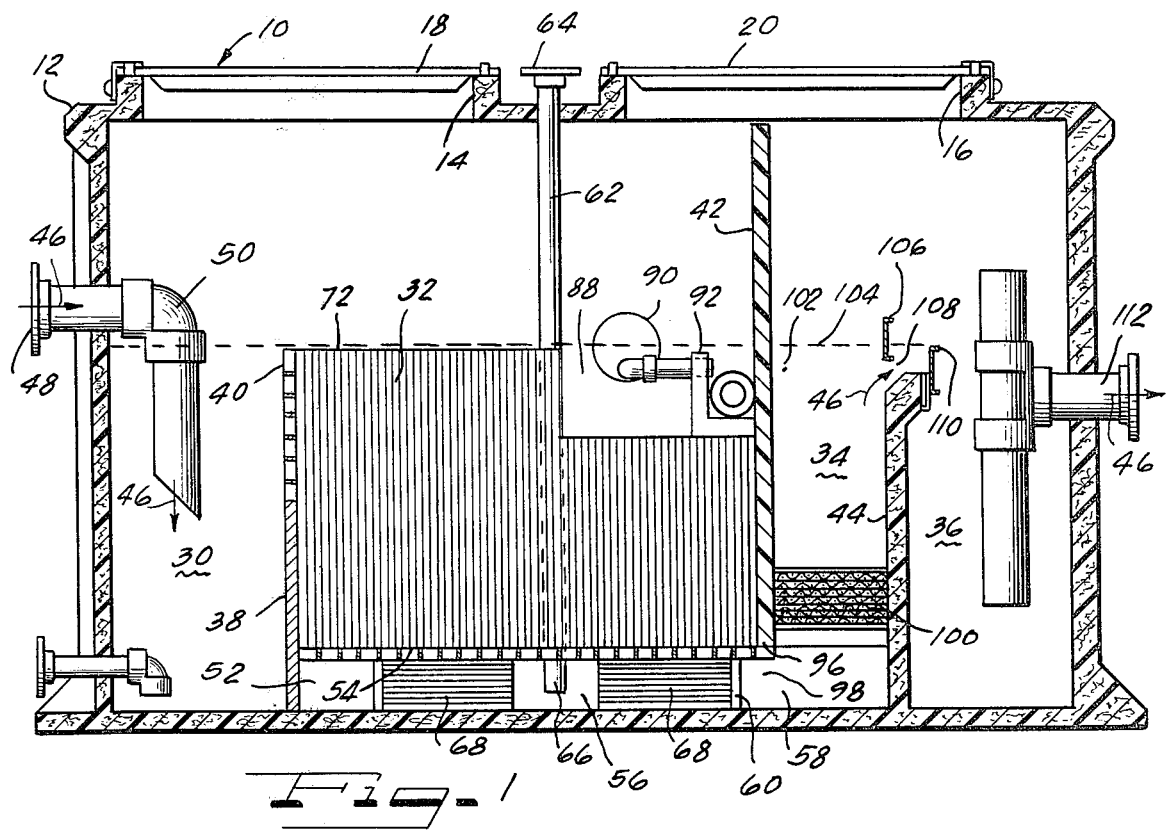
FIG. 1 is a vertical sectional elevational view of a separator embodying principles of the present invention.
Figure 2:
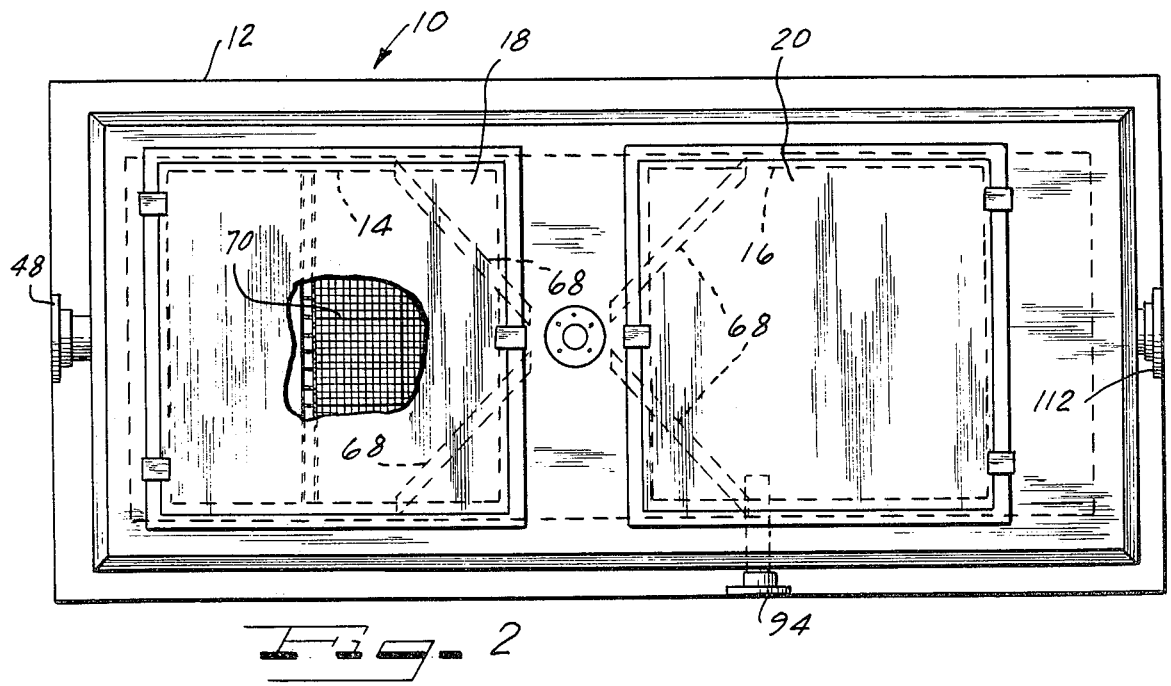
FIG. 2 is a plan view of the separator of FIG. 1 partially broken away to show the tube packs.

A vertical tube coalescer separator embodying principles of the present invention is shown generally at 10, and includes a rectangular tank 12 having two top access openings 14 and 16. The opening 14 is covered with a hinged openable cover 18 and the opening 16 is covered with a hinged openable cover 20.

The tank 12 is desirably made of corrosion-resistant, liquid-tight and insulated lightweight construction such as fiberglass, fiberglass laminate, or the like which offers users substantial flexibility as to installation in the ground, out of the ground, indoors and out-of-doors locations.

As separation of a pollutant such as oil from water improves with temperature, it is important that the tank 12 not subject the liquid flow to a cooling effect. The insulated construction promotes constant temperature and therefore better separation.

In one desirable arrangement of the tank a wood frame may enclose cellular panels. The combination is then sprayed with resin having reinforcing fibers to form a rigid structure. Such a construction is disclosed in U.S. Pat. No. 3,904,524, owned by the assignee of the present invention.

The tank 12 is divided into a distribution chamber 30, a separation chamber 32, a weir chamber 34 and a clarified liquid chamber 36 by respectively a widthwise distribution partition 38 having a lower imperforate portion and an upper portion formed with an array of flow diffuser perforations 40, a submerged outlet partition 42, and a weir partition 44. All three widthwise partitions 38, 42 and 44 are best formed as an integral part of the tank 12 using the construction noted above.

A flow of contaminated liquid 46 such as spent machine shop coolant having in suspension heavy particulate pollutants and tramp oil, or the like, enters the separator 10 through an appropriate inlet 48 and is directed downwardly by an elbow 50 into the distribution chamber 30.

The purpose of directing the liquid flow downwardly into the distribution chamber 30 is to insure smoothing out of turbulence and to provide a steady and uniform diffused flow through the full width area of the upper portion of the partition having the perforations 40 and into the upper upstream portion of the separation chamber 32.

The separation chamber 32 has along the tank bottom a plenum space 52 which is covered by a foraminous grate 54. The plenum space 52 is divided from the chamber 30 by the partition 38 and provides a solids accumulation or sludge area 56 and leads to a rear or downstream discharge area 58.

A sludge draw-off pipe 62 having an upper end 64 extending above the tank 12 and its lower end 66 positioned within the accumulation area 56 facilitates removal of sludge as required. To promote removal, the plenum space area 56 has a baffle system 60 comprising four vertical baffles 68 which converge toward the lower end 66 of the draw-off pipe 62.

Between the distribution partition 38 and the submerged outlet partition 42 and supported on the grate 54 is a filter body matrix of vertical foraminous coalescer tube packs 70 each containing a selected multiple or plurality of individual coalescer tubes 72. In the exemplary disclosure illustrated, approximately one hundred tubes 72 are formed into a pack or module 70 with means retaining the tubes in the module form, for example by fusing the tops and bottoms of the tubes together. Thereby the modules 70 are selectively removable from the tank 12 for cleaning purposes and the like.

As shown in FIGS. 4-6, the tube 72 made of a molded plastic is circular having a hollow center 74 and a tubular wall 76 in which there is formed a plurality of openings 78 disposed in spaced vertical and circumferential array about a circumference of the tube 72. In the illustrated example, approximately fifteen openings 78 of about 5/32 inch diameter each are provided in each circumferential row; each tube 72 is approximately 1¼ inches in outside diameter and has a wall thickness of approximately 1/16 inch, and each tube has a preferably uniformly vertically spaced array of the rows of the openings 78 along its length. Thus, the tubes 72 have foraminous walls in which the holes 78 are closely spaced both circumferentially and longitudinally in a retiform frame comprising longitudinal wall portion bars between vertical rows of the openings 78 and connecting wall portions between the circumferential rows of openings 78, thereby providing spacers and coalescing and solids impingement surfaces between contiguous holes. Preferably, as shown, the holes are of larger area than the width, e.g. 3/32 inch, of the spacing material of the tube wall frame portions between contiguous holes 78 in the circumferential and longitudinal directions of the tube.

One advantage of using a molded product is that the configuration of the openings 78 and connecting wall 76 can be designed to provide a surface area 80 exceeding other known designs by as much as five times despite the advantageous large flow area through the tube walls provided by the preferably all over array pattern of the holes 78 in each tube. In the illustrated embodiment, there is approximately 45 square feet of surface area per cubic foot of space, which compares with approximately 10 square feet of surface area per cubic foot of space as provided by other comparable prior art separators.

Where the fluid 46 is waste water and one of the entrained foreign matters is an oil, it is advantageous to have the tubes 72 made of a material having the characteristics of being oleophilic and hydrophobic, i.e. the characteristic of attracting oil while repelling water, thereby assisting in the development of the improved coalescing results of the present invention under the noted operating conditions.

As is shown by the arrows in FIG. 6, as the flow of liquid 46, which in this case is waste water, passes between and through the tubes 72, oil in droplets 82 sized as small as 20 microns in the waste water 46 accumulates on and in each tube 72. The droplets 82 combine into larger droplets 84 sufficient in size to be bouyant and float upwardly. While the larger droplets 84 of oil are floating upward, heavy foreign matter such as solids become entrapped within the center area 74 of the tube 72 and in substantially diamond-shaped vertical passages 86 formed by each four adjoining tubes 72 and gradually settles to the grate 54 passing therethrough into the plenum space 56.

A light foreign matter collection space 88 is created by using a plurality of longer tubes 72 in an upstream portion of the chamber 32 adjacent to the perforated plate 40 while using a plurality of shorter tubes 72 in a downstream portion of the separator chamber 32. The light foreign matter, which in this case is the oil droplets 84, accumulates in the space 88 and is removed by a skimmer 90 carried by the tank 12 transversely to the direction of flow. This relationship is feasible because as the heavier liquid such as water flows from the upper diffusion section (perforations 40) of the partition 38 into and transversely as well as generally downwardly through the coalescer tubes 72 in the separation chamber 32, the level of the heavier liquid progressively drops as such liquid gravitates toward and through the grate 54. Correspondingly the light liquid (oil) accumulates and rises to the top and provides the true liquid level in the space 88.

The submerged outlet partition 42 may extend to substantially the full-height in the space within the tank 12 but this partition has a bottom horizontal edge 96 located at an elevation approximately equal that of the grate 54 to define a submerged exit opening 98. The liquid flow 46 passes downwardly through the grate 54 and onward downstream into the rear discharge area 58 and through the opening 98 and into the weir chamber 34.

Within the weir chamber 34 and immediately above the opening 98 is a plurality of plastic screen media 100 positioned horizontally and therefore transversely to the upward flow of the liquid 46. Oil droplets 102 that remain in the waste water flow 46 after passage through the separation chamber 32 will be in the 50 micron and smaller size range. The screen media 100 promotes coalescing of these extremely small droplets 102 which float upwardly for collection on a surface 104 of the waste water 46 located between the outlet partition 42 and a widthwise barrier bar 106. The barrier bar 106 is positioned above the weir partition 44 to provide an outlet 108 therebetween. The waste water flow 46 flows through the outlet 108 and over an adjustable top horizontal edge 110 carried by the weir partition 44 and offset from the outlet 108. The edge 110 is adjustable and provides for regulation of the level of the surface 104 of the waste water flow 46. Because the flow path of the waste water in the weir chamber 34 is parabolic while the flow path of the oil droplets 102 is vertical, the separated droplets 102 are not carried over the top edge 110 of the weir partition 44 but collected as noted.

The top edge 110 of weir partition 44 also provides adjustment with respect to the rate of the liquid flow 46 through the separator 10 to ensure that the skimmer 90 is sufficiently submerged to remove light matter accumulated in the space 88.

The liquid flow 46 overflowing the top edge 110 of weir partition 44 collects in the substantially clean liquid chamber 36 from where it can be drawn off by an appropriate discharge pipe 112.

It should be understood that the width, height and length dimensions of the tank 12 and the respective chambers are selected with respect to the volume of liquid to be processed such that the velocity of movement of the liquid flow 46 is sufficiently low to ensure laminar characteristics without turbulence.

In practice, a wide range of clarifying separator units may be provided such as from 10 gallons per minute up to as much as 3600 gallons per minute capacity, by suitable variation in various dimensions of the unit.

Where even greater capacity is required the units may be installed in multiple parallel unit battery relation. Thereby users can readily obtain any coalescing-separator capacity suitable for the user's needs. In any instance, the separator unit provides a complete self-contained assembly which can be readily connected to the contaminated liquid source, a post-processing reservoir, tank for salvaging clarified liquid, a sewer outlet, or the like. Suitable connections are also readily effected for draining off separated light matter such as oil, and may also be effected for removing sludge of heavy matter from the bottom of the tank.

Figure 7:
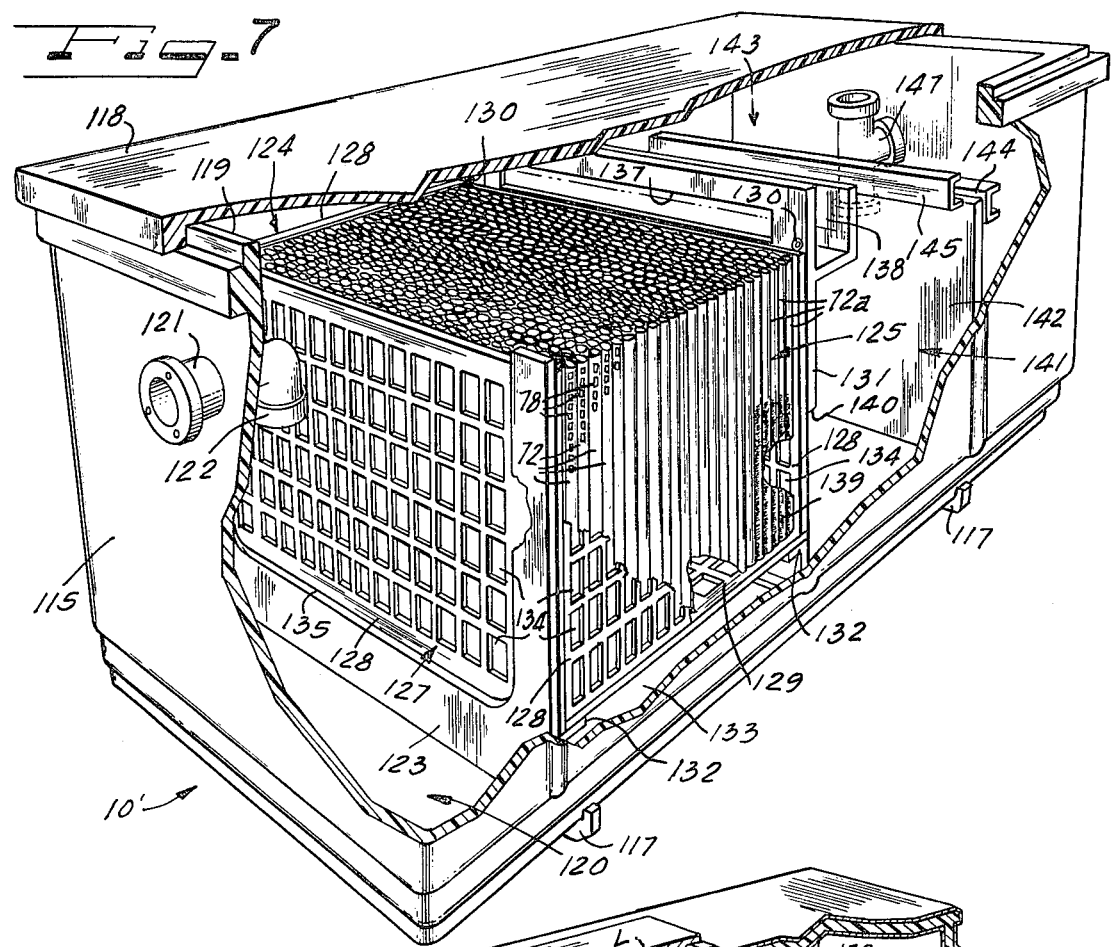
FIG. 7 is a perspective view, partially broken away and in section showing a slight modification of the separator.

A vertical tube coalescing separator 10' (FIG. 7) is especially suitable for smaller volume capacity requirements and comprises a compact tank 115 of corrosion resistant material such as fiberglass having support means 117 under its bottom such as skids permitting the tank to be readily transported by fork lift into selected operating positions, such as in a machine shop for clarifying solid particles and tramp oil from coolant. A removable cover 118 is provided to close a full access opening 119 into the top of the tank. Within one end of the tank 115 is an inlet settling or distribution chamber 120 into the upper portion of which an influent inlet 121 is adapted to discharge downwardly through a large port elbow nozzle 122. Contaminated liquid entering the upper portion of the chamber 120 is adapted to diffuse substantially without agitation in the substantial space between the adjacent end wall of the tank 115 and a vertical partition 123 a substantial lower portion of which is imperforate whereby to provide with the walls of the tank defining the chamber 120 a sludge basin within which to trap such heavy particulate matter as may settle out from the liquid on entry into the chamber, as an initial step or phase in the clarification process. From the chamber 120, the contaminated liquid passes into and through a maximum separation chamber 124 in which the liquid is caused to flow through a filter body 125 which comprises a matrix of the vertical coalescer tubes 72 having all of the attributes described herein. Although the filter tube matrix 125 may be comprised of a plurality of compactly assembled multi-tube packs, all of the large number of tubes 72 which substantially completely fill the separation chamber 124 in all horizontal directions may be individually packed within a rectangular container 127 having four vertical walls 128 and a bottom wall 129 all connected together to provide an open top cartridge container whereby the separating tube filter matrix 125 can be handled as a unit for installation in and removal from the chamber 124. For this purpose the container 127 is desirably provided at the top of each corner with a lifting lug 130 whereby lifting chains can be attached to the container 127 for handling the container 127 and contents by means of hoisting apparatus. This permits the entire coalescer tube filter assembly to be readily bench assembled and easily installed in the separator 10' and removed when it is desired to clean the separator as a whole and the coalescer tube assembly in particular.

Mounting of the container 127 in the tank 115 is effected between the partition 123 and a partition 131 suitably spaced downstream from the partition 123 so as to receive the container 127 in reasonably close but freely slidable relation between the partitions. Between the partitions 123 and 131, the side walls 128 of the container 127 are adapted to fit in reasonably close but freely slidable relation with the side walls defining the tank 115. Supports 132 desirably support the container 127 through its bottom wall 129 in suitably spaced relation above the bottom of the tank 115 to provide a sludge catch basin 133.

To simplify installation, all of the upright walls 128 of the container 127 have over maximum permissible area thereof respective arrays of closely spaced large flow through openings 134. Thereby the container wall 128 which is exposed to the inlet or diffuser chamber 120 through a clearance opening 135 in the partition 123 provides a diffuser baffle for substantially controlling contaminated liquid to pass into the separating and coalescer tube module filter pack 125 with substantial uniformity for laminar onward flow through the perforated tubes 72 in the manner already described for gravity settling of solid pollutants and coalescing and rising of the coalescible, i.e., oil pollutants. Solid pollutants settling downwardly in the passages within and between the tubes 72 are adapted to drop through the grate-like bottom wall 129 of the modular container 127 into the sludge catch basin 133, where the sludge is trapped against onward flow by the support member 132 which serves as a retaining baffle across the downstream end of the sludge catch basin 133. Coalesced light specific gravity pollutant rises upwardly from the coalescer tube passages and spills through a horizontal discharge window slot 137 in the upper portion of the otherwise imperforate partition 131 and at the level of the top of the coalescer tube pack and spills into a collecting trough 138 from which the coalesced pollutant is adapted to be drawn off in any desirable fashion.

At the downstream area of the filter pack 125, the substantially clarified liquid passes from the filter tube pack through a relatively fine filter medium 139 which may comprise a plastic screen pack such as available on the market under the trademark DELTA-PAK which substantially completes filtration of solid particulate fines and minute residual coalescible pollutants. In this instance, the fine filter pack 139 is mounted in the lower downstream end of the container 127 contiguous the grate-like downstream end wall 128 and under shorter foraminous coalescer tubes 72a serving to fill in the tube pack 125 above the filter pack 139 which is of a height to extend across a submerged exit opening 140 defined by a lower edge of the partition 131 spaced above the bottom of the tank 115 for this purpose. As a result of this arrangement, the liquid is caused to flow not only in a generally horizontal direction through the coalescer tube pack 125, but also in a generally downward direction toward the downstream submerged exit opening 140, whereby to improve the downward movement of solid contaminants, and progressively move the liquid as it clarifies downwardly away from the upwardly moving coalesced lighter density pollutants such as oil. In particular this arrangement draws the heavier liquid downwardly away from the coalesced lighter density liquid pollutant such as oil as the oil flows upwardly toward and on through the exit opening 137 into the trough 138 while the water drifts downwardly away from the oil and exits through the submerged opening 140 after passing through the fine filter pack 139.

On leaving the separation chamber 124, the substantially clarified liquid passes by way of the exit opening 140 into a weir chamber 141. A weir partition 142 separates the weir chamber 141 from a clarified liquid chamber or clear well 143 into which the clarified liquid discharges over a vertically adjustable weir plate 144 on the top of the partition 142. Any slight residual surface oil on the substantially clarified liquid in the weir chamber 141 is prevented from escaping by provision of a sheen baffle 145 extending across the top of the chamber 141 in adjacent spaced relation to the upper spillover edge of the weir baffle 142. Discharge of substantially clarified effluent from the chamber 143 is by way of an outlet 147.

Figure 8:
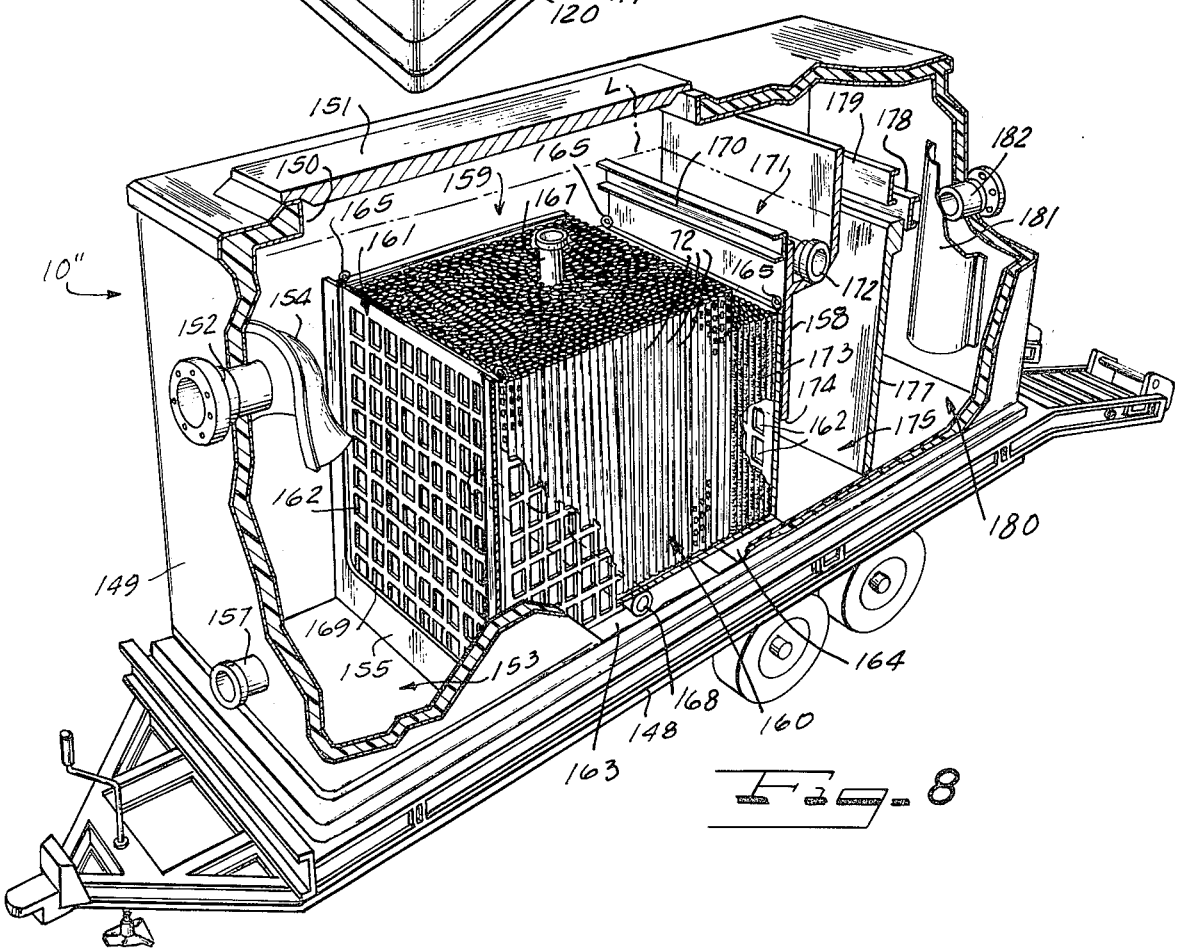
FIG. 8 is a perspective view partially broken and in section showing another modification.

A vertical tube coalescing separator 10″ (FIG. 8) of larger capacity may be mounted in a desirable stationary position, but may for ready transportation to a use site be mounted on a trailer 148. Thereby the separator 10′ can be transported to an oil spill site for environmental cleanup or other site where oil needs to be reclaimed. The unit 10″ comprises a tank 149 desirably of light weight corrosion resistant insulated structure having a top access opening 150 closed by a removable cover 151. An influent inlet 152 opens into the upper portion of a receiving, settling, distribution chamber 153, an inlet diffuser 154 directing influent entering through the inlet 152 generally downwardly in the chamber 153. A partition 155 suitably spaced from the front wall of the tank 149 defines the downstream end of the chamber 153 and has a lower imperforate portion providing with the walls of the tank 149 a sludge catch basin in the bottom of the chamber 153, from which sludge is adapted to be drawn off through an outlet 157. Between the partition 155 and an imperforate partition 158 suitably spaced downstream from the partition 155 and extending across the interior of the tank 149 is a separation chamber 159 having therein a filter body 160 which comprises a matrix of the vertical coalescer tubes 72 having all of the attributes described hereinbefore. Although the filter body 160 may be comprised of a plurality of compactly assembled multi-tube modular packs, they may be individually packed within a rectangular container 161 of rectangular open-top form, at least the front and rear walls of which are provided with an array of large area flow-through openings 162. The bottom wall may be in the form of a suitable grating through which settleable impurities dropping through passages formed by the coalescer tubes 72 will drop into a sludge catch basin 163 in a plenum space under the modular container 161 which rests on suitable supporting means 164 at front and rear ends of the container bottom. At opposite top corners of the container 161 it is desirably provided with means such as chain lift lugs 165 to facilitate installing and removing the coalescing filter modular unit. For sludge removal, a draw-off fitting 167 may be provided comprising a generally inverted T-shaped tubular structure extending downwardly through the coalescer tube pack and having sludge draw-off ports 168 in the sludge basin 163.

From the diffuser chamber 153, the contaminated liquid passes through a large area port 169 in the partition 155 through the openings 162 in the adjacent wall of the container 161 into and through the separating and coalescer tube module filter pack 160 in progressively downwardly biased laminar flow such that in passing through the foraminous tubes 72, in the manner already described herein gravity settling of solid pollutants and coalescing and rising on coalescible pollutants such as oil is effected as a continuous process, the settleable pollutants being collected in the sludge basin 163, and coalescible pollutants rising above the upper ends of the tubes 72 which are submerged below the upper level of liquid L maintained by an adjustable level regulating baffle 170 extending across the top of the transverse partition 158. Oil collecting at the liquid level L spills over the baffle 170 into an oil reservoir trough 171 from which the coalesced oil is adapted to be drawn off through an outlet 172.

At the downstream side of the coalescer tube filter pack module 160 substantially clarified liquid passes through a realtively fine filter medium pack 173 which may comprise a plastic screen pack which substantially completes filtration of solid particulate fines and minute residual coalescible pollutants. In this instance, the fine filter pack 173 is mounted in the lower downstream end of the container 161 contiguous the perforated downstream end wall of the container, with the lower end of the filter 173 on the bottom of the container and the upper end of this filter at a lower elevation than the upper ends of the tubes 72 whereby to increase the oil collection area at that end of the separation chamber 159. Clarified liquid is compelled to pass from the lower portion of the downstream end wall of the container 161 through a submerged exit opening 174 defined by a lower edge of the partition 158 suitably spaced above the bottom of the tank 149 for this purpose. Therefore, the liquid is caused to flow through the separation chamber 159 in a generally horizontal and downward direction toward the exit 174, thereby improving the downward movement of solid contaminants and progressively moving the liquid as it clarifies downwardly away from the upwardly moving colesced lighter density pollutants such as oil.

Beyond the exit opening 174 the substantially clarified liquid enters a weir chamber 175 defined by a transverse weir partition 177 spaced downstream from the partition 158 and having on its upper edge a vertically adjustable overflow baffle 178 in adjacently spaced relation to which is located a sheen baffle 179. On the downstream side of the partition 177, the substantially clarified liquid discharges into a clear well chamber 180 to escape past an outlet baffle 181 through an effluent discharge port outlet 182.

From the foregoing it will be apparent that the present invention provides an especially efficient coalescing separator which is readily adaptable for a wide range of capacities. The vertical foraminous tube coalescing matrix is unusually efficient. Separators embodying principles of the invention are especially suitable for tank dewatering where condensate or rain water must be removed and hydrocarbons separated before discharging the water to a run-off. Draining of ballast from marine vessels at port facilities to separate liquid hydrocarbons from water condensate or ballast is readily effected. Sump cleaning is another area of utility where a sump must be emptied and hyrdrocarbons reclaimed. Of course, metal working coolant recovery is quite efficiently effected by removal of particulate solids and tramp oils. Oil spill cleanup is facilitated.

It will be understood that variations and modifications may be effected without departing from the spirit and scope of the novel concepts of this invention.

I claim as my invention:

1. A self-contained liquid pollutant-separating system for removing oils and settleable solids from incoming feed of water containing such oils and solids comprising:
   (a) an insulated tank having a selective size with respect to said incoming feed to promote flow having laminar characteristics through said tank, said tank having an inlet means for said incoming feed at a first end of said tank and an outlet means for clairified water at a second end;

(b) a distribution chamber in said tank formed by said first end and a widthwise first partition spaced from said end and mounted between sidewalls of said tank, said partition having an open area to provide for passage of water from said distribution chamber;

(c) a separation chamber in said tank formed by said first partition and a widthwise second partition spaced from said first partition and mounted between said sidewalls of said tank, said second partition having a bottom edge spaced above a bottom of said tank to provide a submerged outlet for water from said separation chamber, said chamber further including a sludge accumulation area below a grate floor spaced above said bottom of said tank;

(d) separating means in said separation chamber comprising a plurality of vertically disposed perforated oleophilic and hydrophobic coalescing tubes through which all of the water entering the separating chamber from the discharge chamber through said open area in said first partition must pass transversely through the perforations in the tubes and contact the tubes both externally and internally, said tubes being supported above said grate and having upper open ends submerged below liquid level in said separation chamber and lower open ends opening downwardly toward said grate floor;

(e) oil accumulation means located in substantial alignment with the tops of said tubes to receive oil coalesced in said tubes and rising to said liquid level, and comprising trough means at the upper part of said second partition;

(f) a weir chamber in said tank formed by said second partition and a widthwise weir partition between said side walls of said tank and spaced from said second partition, said weir partition having an adjustable horizontal top edge spillover device for controlling water level in at least said weir chamber;

(g) fine filter means positioned adjacent to said submerged outlet so that all water that passes through said outlet to said weir chamber must also pass through said filter means which is adapted for coalescing any minute oil droplets from the water that may have escaped said separating means tubes;

(h) an oil barrier bar extending across said weir chamber in adjacent spaced relation to said spillover device and partially submerged in the liquid level in said weir chamber as a sheen baffle to restrain escape of residual oil from said weir chamber;

(i) a clarified liquid chamber in said tank in space between said weir partition and said second end of said tank to receive clarified water overflowing said weir partition over said spill over device, and providing a reservoir to supply said outlet; whereby said incoming feed of water enters the tank through said inlet into said distribution chamber and then enters said separation chamber, oils and settleable solids in said water are separated therefrom as said water flows transversely through the perforations in said tubes and contacts the tubes externally and internally, and separated oils are coalesced and ascend and are removed by way of said oil accumulation means and solids descend to said sludge accumulation area, the substantially clarified water flowing through said submerged opening and through said fine filter means into said weir chamber from which the substantially clarified water flows over said spill over device and into said clarified water chamber for discharge through said outlet.

2. A separating system according to claim 1, wherein said fine filter means comprises a plastic screen pack extending across the lower portion of said weir chamber adjacently above said submerged opening.

3. A system according to claim 1, wherein said fine filter means comprise a pack of filter material extending across said submerged opening at the separation chamber side of said second partition.

4. A system according to claim 1, including sludge removal means communicating with said accumulation area.

5. A system according to claim 1, including grid-like diffuser means between said distribution chamber and the separating means tubes in said separation chamber whereby to promote laminar flow of the water to and through said separating means tubes.

6. A system according to claim 1, comprising a container removably received in said separation chamber and having said tubes mounted as a pack in the container, the container having means to facilitate installation and removal with respect to said separation chamber.

7. Apparatus for separating pollutants such as oils and settleable solids from a generally horizontal flow of water containing such oils and solids, comprising:

(a) tank means for containing and directing said flow of said water, said tank means having an inlet for continuous input of water and an outlet positioned opposite said inlet for discharge of said water;

(b) a separation area in said tank means between said inlet and said outlet for separation and accumulation of said solids and said oils from the flowing water;

(c) means for coalescing said oils and separating said solids in said water, said means mounted in said separation area and comprising a filter body of hollow, substantially vertical and substantially cylindrical tubes having arrays of holes in closely spaced relation both circumferentially and longitudinally in their walls through which the generally horizontal flow of water is caused to pass, said tubes being adjacently clustered and defining substantially vertical passages through the interiors of the tubes and substantially vertical passages between the tubes so that the flowing water will contact substantial surface areas of the tube walls inside and outside of the tube walls for especially efficient coalescing of oils;

(d) water level regulating means for maintaining a liquid level within predetermined limits within said separation area and above the tops of said tubes;

(e) the coalesced oils being adapted to float upwardly in said passages and said solids being adapted to settle downwardly in said passages as said water flows against said tubes and through said holes in said tube walls so that said pollutants are substantially removed by the time the substantially clarified water is discharged;

(f) removal means mounted in said tank means to facilitate removal of said accumulated coalesced oils and said accumulated solids from said separation area, (g) said separation area having a bottom plenum space covered by a grating, said filter body of tubes being supported by said grating, (h) a solids accumulation area defined in said plenum space between said grating and the bottom of said tank means, (i) said water level regulating means comprising a weir area including a widthwise separating partition, (j) said partition separating said weir area from said separation area and being carried by sidewalls of said tank means, said partition having a bottom horizontal edge at a level approximating a level of said grating, said edge defining a top of a submerged opening between said separation area and said weir area toward which the water is caused to drift downwardly in said separation area, and (k) a widthwise weir partition spaced from said separating parititon, said weir partition separating said weir area from a clean water area of said tank means and being carried by said sidewalls, said weir partition having an adjustable top horizontal edge for regulating the liquid level in said separation area and weir area, wherein said separated solids settle to and pass through said grating to accumulate in said accumulation area as said water drifts downwardly and flows through said submerged opening, into said weir area and over said weir partition.

8. A coalescer-separator according to claim 7, wherein said tubes are grouped in selected multiples to form modules, and means retaining the tubes in modular form for selective removal of the modules from the tank.

9. A coalescer-separator according to 7, wherein said tubes are mounted in a container having a bottom grid-like wall providing said grating, and grid-like front and rear walls so that the liquid can flow into the container through said front wall and through the coalescer tubes and then out of the container through said rear wall and heavy foreign matter can drop through said grid-like bottom wall of the container, said container being removable and replaceable as a module with respect to said tank.

10. Apparatus according to claim 7, wherein said tubes are formed from an oleophilic and hydrophobic material.

11. Apparatus according to claim 7, wherein said tubes are formed from plastic material, and the upper and lower ends of said tubes being fused together to maintain the tubes assembled in a pack.

12. Apparatus according to claim 7, wherein each tube comprises a frame having longitudinal frame bars which are narrower in their areas between contiguous openings, so that in the line contact relationship of the tubes said longitudinal frame bars will not substantially obstruct flow through any openings across which the bars may extend in said line contact relationship of the tubes.

13. Apparatus according to claim 7, wherein said tubes are of molded plastic, have an outside diameter of approximately 1¼ inches, a wall thickness of approximately 1/16 inch, said openings comprise about 15 in each circumferential row, each opening is of about 5/32 inch in diameter, and the width of said wall portions separating the openings from one another being about 3/32 inch.

14. Apparatus for separating pollutants such as oils and settleable solids from a generally horizontal flow of water containing such oils and solids, comprising:

(a) tank means for containing and directing said flow of said water, said tank means having an inlet for continuous input of water and an outlet positioned opposite said inlet for discharge of said water;

(b) a separation area in said tank means between said inlet and said outlet for separation and accumulation of said solids and said oils from the flowing water;

(c) means for coalescing said oils and separating said solids in said water, said means mounted in said separation area and comprising a filter body of foraminous hollow, substantially vertical and substantially cylindrical tubes having arrays of holes in closely spaced relation both circumferentially and longitudinally in their walls through which the generally horizontal flow of water is caused to pass, said tubes being adjacently clustered and defining substantially vertical first passages through the interiors of the tubes and substantially vertical second passages between the tubes, said holes in the tube walls being larger than the width of material of the tube walls providing spacers and coalescing and solids impingement surfaces between contiguous holes, so that the flowing water will contact substantial surface areas of the tube walls inside and outside of the tube walls for especially efficient coalescing of oils and separation and settling of solids;

(d) water level regulating means for maintaining a liquid level within predetermined limits within said separation area and above the tops of said tubes;

(e) the coalesced oils being adapted to float upwardly in said passages and said solids being adapted to settle downwardly in said passages as said water flows against said tubes and through said holes in said tube walls so that said pollutants are substantially removed by the time the substantially clarified water is discharged;

(f) removal means mounted in said tank means to facilitate removal of said accumulated coalesced oils and said accumulated solids from said separation area;

(g) said separation area having a bottom plenum space covered by a grating, said filter body of tubes being supported by said grating;

(h) a solids accumulation area defined in said plenum space between said grating and the bottom of said tank means;

(i) said water level regulating means comprising a weir area including a widthwise separating partition;

(j) said partition separating said weir area from said separation area and being carried by sidewalls of said tank means, said partition having a bottom horizontal edge at a level approximating a level of said grating, said edge defining a top of a submerged opening between said separation area and said weir area toward which the water is caused to drift downwardly in said separation area; and (k) a widthwise weir partition spaced from said separating partition, said weir partition separating said weir area from a clean water area of said tank means and being carried by said sidewalls, said weir partition having an adjustable top horizontal edge for regulating the liquid level in said separation area and weir area, wherein said separated solids settle to and pass through said grating to accumulate in said accumulation area as said water drifts downwardly and flows through said submerged opening, into said weir area and over said weir partition.

15. Apparatus according to claim 14, wherein said tubes are formed from an oleophilic and hydrophobic material.

16. Apparatus according to claim 14, wherein said tubes are formed from plastic material, and the upper and lower ends of said tubes being fused together to maintain the tubes assembled in said pack.

17. Apparatus according to claim 14, wherein each tube comprises a frame having longitudinal frame bars which are narrower in their areas between contiguous holes so that in the line contact relationship of the tubes, said longitudinal frame bars will not substantially obstruct flow through any holes across which the bars may extend in said line contact relationship of the tubes.

18. Apparatus according to claim 14, wherein said tubes are of molded plastic, have an outside diameter of approximately 1¼ inches, a wall thickness of approximately 1/16 inch, said holes comprise about 15 in each circumferential row, each hole is of about 5/32 inch in diameter, and the width of said wall portions separating the holes from one another being about 3/32 inch.

* * * * *